No. 720,773. PATENTED FEB. 17, 1903.
M. H. BALL.
OUTSIDE CALIPERS.
APPLICATION FILED JULY 11, 1902.
NO MODEL.
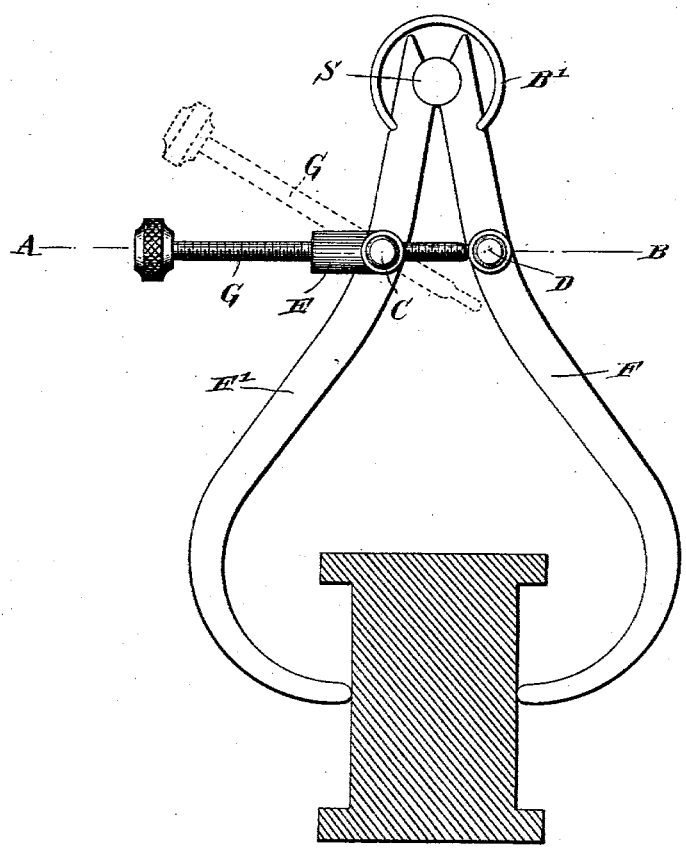
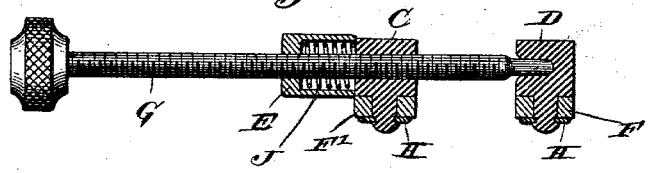
Witnesses:
Otis P. Stone
H. C. Kimney
Inventor:
Martin H. Ball.

UNITED STATES PATENT OFFICE.

MARTIN H. BALL, OF WATERVLIET, NEW YORK.

OUTSIDE CALIPERS.

SPECIFICATION forming part of Letters Patent No. 720,773, dated February 17, 1903

Application filed July 11, 1902. Serial No. 115,213. (No model.)

*To all whom it may concern:*

Be it known that I, MARTIN H. BALL, a citizen of the United States, residing at Watervliet, in the county of Albany and State of New York, have invented a new and useful Improvement in Outside Calipers, of which the following is a specification.

The object of this invention is to provide a caliper to accurately and conveniently take all outside measurements that are customarily taken with the ordinary plain and spring outside calipers in common use and also to take measurements as indicated in the accompanying drawings, as thickness of metal in a bar, as shown, when the operator does not have access to either end of same, or to any place along the sides where the bar is no thicker than at the portion to be measured that has to be spanned by the calipers before reaching the portion to be measured. I attain these objects by the mechanism illustrated in the accompanying drawings, in which—

Figure 1 is a front elevation, and Fig. 2 an enlarged vertical section, of a part of the calipers on the line A B.

Similar letters refer to similar parts throughout the several views.

F' and F are the legs, connected near their upper ends by the spool S, which forms the joint, and are all held in place by the mainspring M.

The spool S is not shown in detail in the drawings, as it is not a part of my invention and is only used to show a form of calipers to which my improvement can be attached.

G is the adjusting-screw with knurled head, to be operated by thumb and fingers. The thread being made left hand makes the calipers operate the same as those in common use and avoids confusion when using both kinds alternately.

C and D are studs passing through holes in the legs and are riveted down over small washers H H on the opposite side, the parts being drawn together enough to secure a slight amount of friction, so they will keep their position when the legs are drawn apart in transferring. Through lug C is tapped a hole through which screw G passes, and into stud D a socket is made to receive the point of screw G.

E is a barrel bored out to receive the spiral spring J at the end that joins stud C and threaded at the opposite end to fit screw G and is prevented from turning with screw G by its being fitted around stud C, as shown in Fig. 1.

In calipering over a flange, as shown in Fig. 1, the legs are drawn apart until their points pass over the flange. The screw G is then turned until the points come in contact with the part to be measured, after which the legs are drawn apart and held by hand until the points clear the object, when they are allowed to come back to their original position, the screw G leaving the socket in stud D when the legs were drawn apart and drops back in its place again when they are released, thus leaving the legs the exact distance apart that they were when they were in contact with the object measured. A scale may now be applied at the points of legs and the size ascertained.

The spring J has a tendency to force the barrel E and stud C apart, thus creating a slight friction, preventing the screw G from turning from any jar that it might receive when transferring and also taking up all backlash.

The screw G being forced to the bottom of the socket in stud D by mainspring M always has the same amount of pressure applied, and consequently this caliper is more accurate than any kind of transfer-caliper that has its movable leg put back by hand.

When calipering lathework in motion this caliper will not catch, bend, or lose its size, as others do when crowded over the work while the work is too large; but the adjusting-screw G will come partly out of socket in stud D and spring back to its former place when taken from the work.

When not in use, the legs may be drawn apart enough to bring the screw G out of socket in stud D, when the screw may be tipped, as shown by the dotted lines in Fig. 1, and the points of legs allowed to come together, releasing to a great extent the mainspring M, which has a tendency to prolong its life.

I am aware that the way of making and attaching the legs F' F, spool S, and mainspring M and also the way of attaching studs C and D to legs is not new, but has been used for several years, and I do not claim this as my invention; but What I do claim as my invention, and desire to secure by Letters Patent, is—

1. The combination in outside calipers of the legs thereof, an adjusting-screw having socketed engagement with one of the legs, a stud C pivotally mounted in the other leg and having a transverse aperture threaded to receive said screw, a barrel E screw-threaded at one end to fit said adjusting-screw and at the other end shaped to abut against and fit around said stud C the end of said barrel which abuts against said stud being bored out to receive a spiral spring, and said spring bearing at one end against the bottom of the bored-out portion of said barrel and at the other end, against said stud, all combined and operated substantially as set forth.

2. The combination in outside calipers of the legs thereof, a stud C having a threaded aperture and a stud D provided with a socket, said studs being respectively swiveled to said legs, and an adjusting-screw G having threaded engagement with said aperture in the stud C and having its end adapted to be loosely housed in said socket of the stud D, whereby the screw may be readily disengaged from said socket and reëngaged therewith for the purpose set forth.

MARTIN H. BALL.

Witnesses:
H. C. KIMMEY,
OTIS P. STONE.